United States Patent
Venkataraman

(10) Patent No.: US 9,338,488 B1
(45) Date of Patent: May 10, 2016

(54) METHOD AND APPARATUS FOR PROVIDING VIDEO OPTIMIZATION FOR BROADCAST MEDIA

(75) Inventor: Ramesh Venkataraman, Palatine, IL (US)

(73) Assignee: Tellabs, Inc., Naperville, IL (US)

( * ) Notice: Subject to any disclaimer, the term of this patent is extended or adjusted under 35 U.S.C. 154(b) by 313 days.

(21) Appl. No.: 13/081,343

(22) Filed: Apr. 6, 2011

(51) Int. Cl.
*H04N 21/24* (2011.01)

(52) U.S. Cl.
CPC .................................. *H04N 21/24* (2013.01)

(58) Field of Classification Search
None
See application file for complete search history.

(56) References Cited

U.S. PATENT DOCUMENTS

| | | | |
|---|---|---|---|
| 2004/0045029 A1* | 3/2004 | Matsuura | H04N 7/17318 725/93 |
| 2005/0028219 A1* | 2/2005 | Atzmon et al. | 725/116 |
| 2007/0180465 A1* | 8/2007 | Ou et al. | 725/34 |
| 2012/0023533 A1* | 1/2012 | Wang et al. | 725/109 |

* cited by examiner

*Primary Examiner* — Cai Chen
(74) *Attorney, Agent, or Firm* — James M. Wu; JW Law Group

(57) ABSTRACT

A system and method configured to selectively broadcast channelized video contents between multicasting sessions and/or uni-casting sessions are disclosed. In one embodiment, a process of media broadcast transmits channelized video content over a uni-casting session from a content provider to first user equipment ("UE") via a base station. The channelized video content and number of UEs receiving the channelized video content are tracked and accounted. Upon receiving a second request for the channelized video content from a second UE via the base station, a multicasting session capable of broadcasting the channelized video content is established. The process allows the first UE and the second UE to receive the channelized video content via the multicasting session.

20 Claims, 8 Drawing Sheets

METHOD AND APPARATUS FOR PROVIDING VIDEO OPTIMIZATION FOR BROADCAST MEDIA

FIELD

The exemplary embodiment(s) of the present invention relates to communications network. More specifically, the exemplary embodiment(s) of the present invention relates to video optimization for media broadcast.

BACKGROUND

A network environment typically includes hundreds and thousands of network nodes and/or devices, such as routers, gateways, hosts, hubs, and switches, capable of delivering information using packets or packet flows from source devices to destination devices. With increasing demand for more information to be transmitted between users/subscribers and content providers, network providers constantly upgrade the network(s) to up-to-date technology with faster high-speed communication links to handle voluminous data files. High-speed communication typically enhances bandwidth and speed for voice, video, and data transmission to/from subscribers and/or content providers.

With exploding growth of mobile video, audio, and data transfer over cellular or wireless network, service providers are transitioning from 2G (second-generation) wireless service to more data intensive 3G, 4G, or 5G services. Moving or transporting massive amounts of video and audio information over a communications network can cause traffic congestions partially due to the fact that the pace of growth in demand for network bandwidth is faster than the pace of improvement in technology that is able to handle the traffic. With increasing capability of video presentation in mobile devices, channelized media broadcasting over a mobile communications network is in demand. The growth of mobile data fosters mobile traffic congestions.

To provide media broadcasting, typical video broadcasts are predominantly uni-casting between end user's device and content provider or server. A problem associated with uni-casting video delivery method is that it is a point-to-point link for each end device and it consumes a lot of network resources if many point-to-point links are established. Multiple users or subscribers receive the same broadcast via multiple point-to-point links can clog the network.

To improve media broadcast capability, service provider employs multimedia multicast broadcast such as Multimedia Broadcast and Multicast Services (MBMS) to deliver channelized video content via existing cellular network. However, a problem associated with the conventional multicasting services such as MBMS is that the service delivers media content without knowledge of usage of channels and number of users or viewers. For example, using MBMS to broadcast channelized video content to one (1) or zero (0) user is not an efficient way to use network resources.

SUMMARY

A network system is capable of broadcasting channelized video contents using either a multicasting session or a uni-casting session based on number of users. In one embodiment, a delivery process of media broadcast transmits channelized video content over a uni-casting session from a content provider to first mobile user equipment ("UE") via a base station. The channelized video content and number of users (or UEs) that receive the channelized video content are tracked and stored. Upon receiving a second request for the channelized video content from a second UE, a multicasting session capable of broadcasting the channelized video content is established. The channelized video content is subsequently broadcasted to the first UE and the second UE via the multicasting session.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
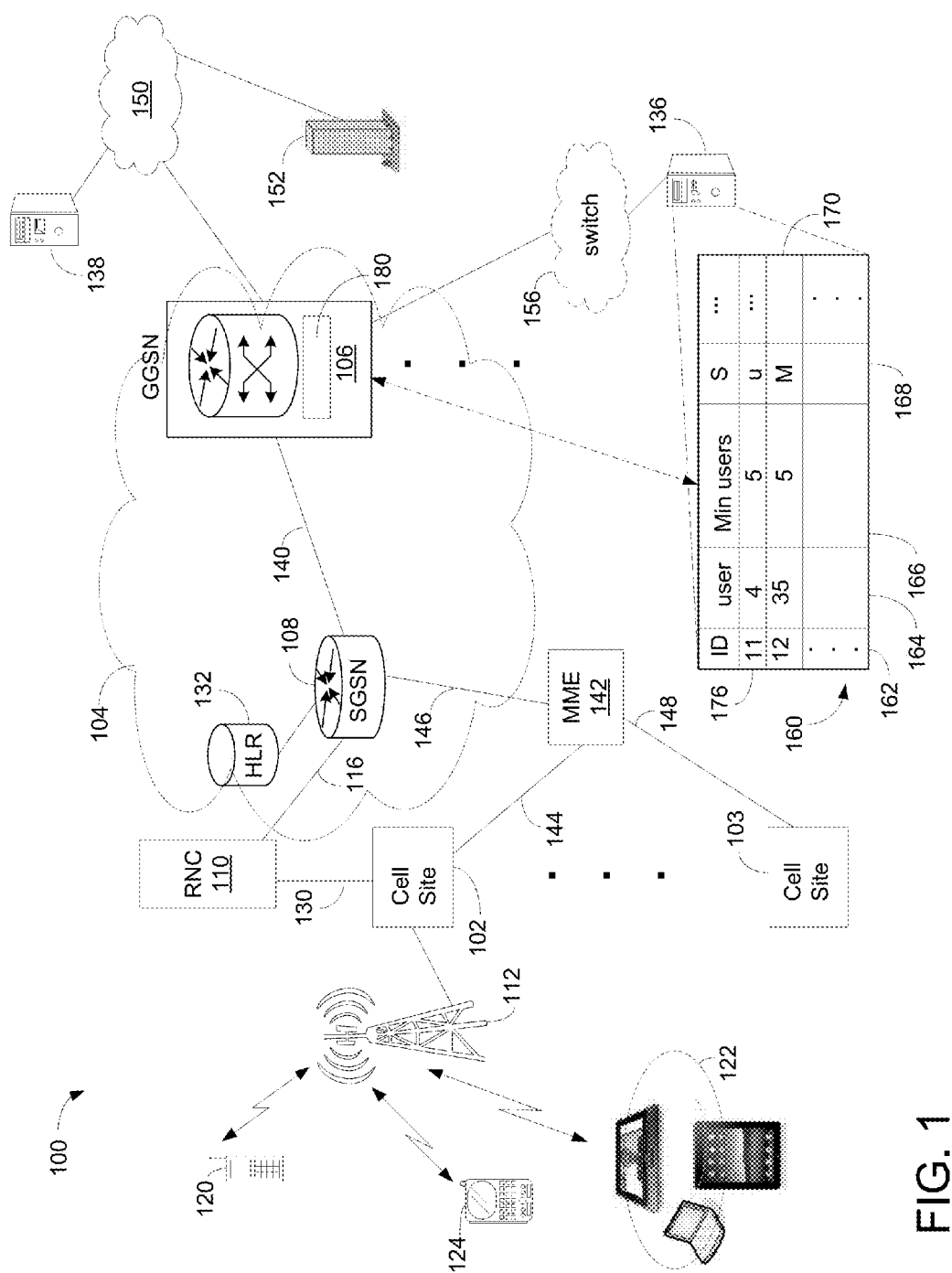
FIG. 1 is a block diagram illustrating a network configuration having one or more network nodes capable of selectively choosing between a uni-casting and a multicasting to broadcast channelized video content in accordance with one embodiment of the present invention.

Exemplary embodiment(s) of the present invention is described herein in the context of a method, device, and apparatus of broadcasting channelized media broadcast to mobile devices with mobile video optimization approach.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It should be noted that the term "data packets" can also be referenced as "data stream," "data flow," "flow," "packet flow, " "packet stream," "data frames," "information," "frames," et cetera. Moreover, connections may also include wires, wireless connections, cables, coax lines, telephone lines, Internet backbones, Ethernet connections, and so forth.

Exemplary embodiment(s) of the present invention discloses a network system capable of selectively choosing between uni-casting and multicasting for broadcasting channelized video content based on number of users. A process of media broadcast transmits channelized video content over a uni-casting session from a content provider to first user equipment ("UE") via a base station. The channelized video content and number of UEs that receive the channelized video content are tracked and accounted. Upon receiving a second request for the channelized video content from a second UE, a multicasting session capable of broadcasting the channelized video content is established. The channelized video content is subsequently broadcasted to the first UE and the second UE via the multicasting session.

An exemplary embodiment of the present invention discloses a concept of selective broadcast. When the broadcast is turned on and when there are at least two or more users served by a NodeB watching the same channel, NodeB switches from uni-casting to multicasting. It should be noted that broadcast is selective in a sense that not all NodeB's in the network will broadcast. The broadcast will happen in the NodeB when there are more than two users watching the channel thereby multicasting is a more efficient broadcast mechanism.

FIG. 1 is a block diagram 100 illustrating a network configuration having one or more network nodes capable of selectively choosing between a uni-casting and a multicasting to broadcast channelized video content in accordance with one embodiment of the present invention. Diagram 100 illustrates cell sites 102-103, switching network 104, network nodes 106-108, and radio network controller ("RNC") 110. Node 106 is further coupled to Internet, wide area network ("WAN"), or virtual private network ("VPN") 150. Internet, WAN, or VPN 150, hereinafter referred to as Internet, provides network communication between node 106 and network devices such as server 138 and content provider 152. It should be noted that the underlying concept of the exemplary embodiment(s) of the present invention would not change if one or more blocks (or devices) were added to or removed from diagram 100.

Diagram 100 can also be referred to as a third generation ("3G") cellular network configuration wherein switching network 104 may be referred to as core network and cell sites 102-103 may be referred to as radio access networks. It should be noted that a different network architecture or configuration may be implemented for 4G or 5G cellular networks with different layout of network elements, and/or differently-named network elements, but the underlying concept of exemplary embodiment would not change.

RNC 110, for example, may couple to other network elements such as a second RNC or PCU (packet control unit), not shown in FIG. 1, to enhance network management and communication. Connections 116 and 140 are used to facilitate communication between RNC 110 and node 106. Connections 116 and 140 may be wired or wireless connections. RNC 110 provides network management for controlling network elements ("NEs") in UMTS (universal mobile telecommunications system) radio access network ("UTRAN") and base stations that are connected to it. RNC 110 may also be connected to a serving general packet radio service support node ("SGSN") in a packet switch core network ("PSCN").

Network node 106, which in one embodiment can be a GGSN, includes one or more routers or switchers capable of managing, monitoring, and routing network traffic or network flows between sources and destinations. A network flow or packet flow, in one example, is a network access initiated by a subscriber. Network node or GGSN 106, hereinafter referred to as GGSN, can also be a router, Access Service Network Gateway, Packet Data Network Gateway ("P-GW" or "PDN-GW"), Serving Gateway ("S-GW"), switch, hub, or a combination of router, Access Service Network Gateway, P-GW, S-GW, switch, and/or hub.

GGSN 106, in one embodiment, includes a module of video optimization broadcast ("VOB") 180 capable of delivering or broadcasting video stream or channelized video content to end users based on information stored in database 160. Depending on applications, VOB 180 can be a component of hardware, firmware, software, or a combination of hardware, firmware, and software. In another embodiment, VOB 180 can be an independent network device. VOB 180, in one aspect, includes broadcast database 160. Alternatively, database 160 is located at a remote device such as server 136. During an operation, GGSN 106, for instance, looks for two (2) conditions to be met before multicasting takes effect. First condition is to verify the same channelized video that is being accessed by at least two (2) mobile users. Second condition is to determine the two (2) mobile users are at the same NodeB/eNodeB. Once both conditions are verified, GGSN instructs the eNodeB to move both mobile users to the same set of channel whereby the eNodeB multicasts the radio signal or broadcast the radio signal to both users.

GGSN 106 is able to access a broadcast database (or tracking) database 160 via a bandwidth control server 136. Depending on the applications, server 136, for example, can be directly connected to GGSN 106 or connected through a switching network 156. Alternatively, GGSN 106 includes broadcast database 160. A function of GGSN 106 is to identify and/or inspect every packet flow in the network traffic based on subscriptions as well as policies. Note that GGSN 106 or VOB 180 keeps track of number of users receiving or viewing a particular channelized video content. An advantage of using VOB or GGSN is to selectively choose to broadcast the service in certain NodeB/eNodeB.

The channelized video content, in one embodiment, includes video and audio information capable of being streamed from a content provider such as ABC network to a user's mobile equipment(s). For example, the channelized video content may be a live sports game such as a super bowl game. An advantage of broadcasting channelized video content is that it enables a mobile device such as a smart phone or iPad® to select one of media broadcasting channels such as a television channel to view a program or live show.

Switching network 104, also known as a core network, transfers or routes information or network traffic between clients and network servers. Switching network 104 can be an IP and/or Multi Protocol Label Switching ("MPLS") based switching network which may operate at a layer of Open Systems Interconnection Basic Reference Model ("OSI model"). Network 104 may further include network node 108, a home location register ("HLR") 132. Network 104 is capable of routing information between cell sites 102-103 and Internet 150 via nodes 106-108. Node 108 transmits information between cell site 102 and HLR 132 via connections 116 and 130. GGSN 106 transmits information to (and receives information from) cell site 102 via connections 140, 116, and 130.

Node 108, in one embodiment, is an SGSN configured to authenticate portable wireless UEs, registering mobile devices, collecting network usage information for billing, et cetera. While SGSN 108 tracks and/or controls mobile communication, GGSN 106 inspects and routes information and/or packet traffic between mobile terminal(s) and intended destination(s). Alternatively, node 108 is connected to a mobility management entity ("MME") 142 which is also able to route packet streams to/from a long term evolution ("LTE") network. MME 142, for example, can track and/or page active and/or idle user equipments ("UEs") or subscribers' mobile terminals in an LTE network. Note that node 108 can include MME functions. It should be noted that node 108 can be SGSN, MME, and/or a combination of SGSN and MME.

Cell site 102, also known as base station, node B, or eNodeB, includes a radio tower 112. Radio tower 112 is further coupled to various UEs, such as a cellular phone 120, a handheld device 124, iPad® 122, via wired or wireless communications. Handheld device 124 can be a smart phone, such as iPhone®, BlackBerry®, Android®, and so on. Cell site 102 is also capable of facilitating network communication between mobile devices such as handheld device 124 and iPad® 122 via radio tower 112. It should be noted that cell site 102 may include additional radio towers as well as other land switching circuitry. In one embodiment, cell site 102 is able to optimize linear video delivery by broadcasting channelized video content via a multicasting session(s) or a uni-casting session.

Broadcast database 160, in one embodiment, stores collected data used to monitor or track status of one channelized video content. Depending on the applications, database 160 can be hardware, firmware, software, or a combination of hardware, firmware, and software. Upon receipt a request for a particular channelized video content, VOB 180 identifies the channelized video content such as Disney channel, and uses data stored in database 160 to identify whether the channelized video content is a new channel or an existing channel that is currently broadcasting. Database 160 also stores information relating to how many users or subscribers who are currently receiving or watching the channelized video content. Database 160 further stores information indicating whether the broadcasting delivery method is in uni-casting or multicasting.

For example, broadcast database 160 includes identifier ("ID") column 162, user column 164, minimal user column 166, and session type column 168. ID identifies the type or channel relating to the nature of channelized video content such as Disney channel. For example, value of "11" of ID indicates the channelized video content is, for example, CNN new channel. Column 164 indicates currently number of users or user's UEs receiving or watching the channelized video content. Column 166 refers to a predefined minimal number of users which may be set by a network operator. The predefined minimal number of users such as five (5) is a minimal number in order for broadcasting via a multicasting efficiently. The predefined minimal number of users, in one aspect, is set based on the efficiency of data delivery and usage of network resources. For example, if the total number of users is less than a predefined minimal number such as 5, it would be more efficient to deliver channelized video content using uni-casting delivery mechanism than multicasting delivery method. If, however, the total number of users is equal or larger than a predefined minimal number, it would be more efficient to deliver channelized video content using multicasting delivery mechanism than uni-casting delivery method. Session type 168 indicates whether the current broadcast is using uni-casting or multicasting. For example, row 176 indicates that four (4) users are currently watching channelized video content with an identity value of "11". Since the predefined minimal number is five (5) which is greater than the current number of users, the current broadcasting session is uni-casting as indicated by letter "u". Row 170, on the other hand, indicates that 35 users are currently watching channelized video content with an identity value of "12". Since the predefined minimal number is five (5) which is smaller than the current number of users, the current broadcasting session is multicasting as indicated by letter "m".

Alternatively, a database or structure similar to broadcast database 160 may be used or installed in every nodeB in the network. Each nodeB, in one embodiment, reserves a portion of resource for multicasting. The database and/or reserved resources can be accessed and used whenever there are more than one mobile user (or minimal number of users) using the channelized video service. GGSN 106, for example, is able to indicate multicasting implementation to eNodeB via a message. Upon receipt of the message, eNodeB allocates the reserved resource to the mobile user.

Mobile networks are classified into two parts, namely a radio access part such as cell site 102 and core network part such as network 104. The mobile network serves as an IP connection provider to the mobile end user device. The core network, which may include a gateway node (SGSN, GGSN), allocates the IP address to the mobile device enabling the allocated mobile device to communicate with the global IP. In one example, GGSN acts as a router and the IP address is allocated by a DNS server. GGSN provides a tunnel to the mobile user. Embodiment(s) of VOB entrenched or located in the core network uses IP transport to deliver the application like channelized video, Web content, Video, Chat, Music et cetera. The core network may include other accounting and authorization components, such as billing, charging, subscribing, tracking, authorizing, performance, usage, and the like.

The radio access network includes a radio base station such as cell site 102 and a controller. The controller can be located physically within a base station node or a gateway node. In one example, the radio network controller and the base station constitute the radio access network. The core network or a gateway node connects to a radio access network for communicating with the IP network. The gateway node is a gateway for IP access of wireless networks. The gateway node, in one aspect, authenticates wireless user(s) for connecting to an IP network by offering IP and TCP level services to the wireless user.

When working with a linear programming content such as channelized video content, the mobile network operator, for example, offers channelized video programming as an extension to the residential subscriptions. The extension to channelized program can be viewed as a service offering by a mobile network operator. An advantage of offering selectively choosing between uni-casting and multicasting for channelized broadcast is to alleviate overall network congestion since broadcasting channelized video content to a large group of audience is more efficient than uni-casting delivery methods.

Figure 2A:
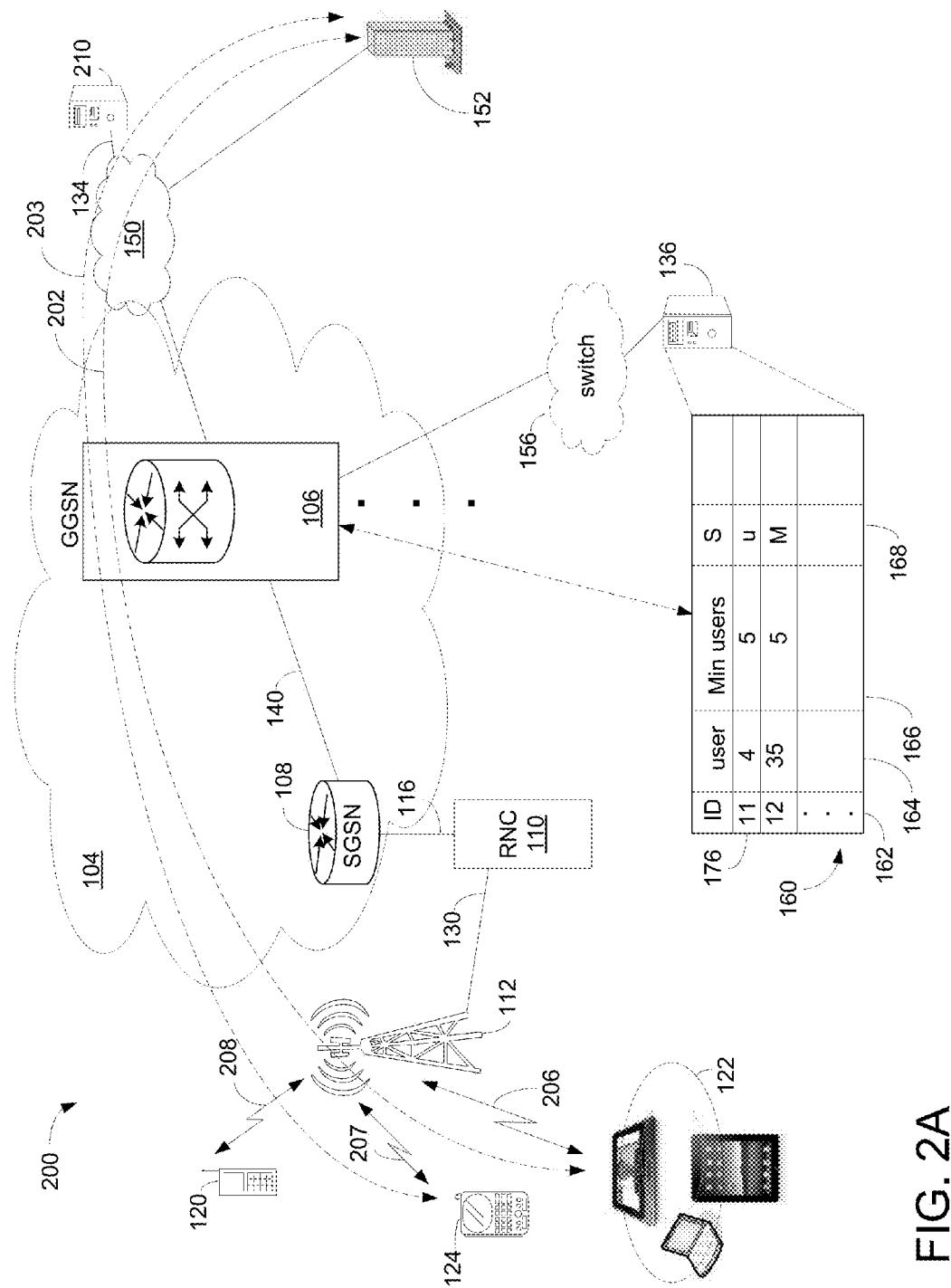
FIGS. 2A-B are block diagrams illustrating simplified network configurations capable of implementing video optimization for broadcast media in accordance with one embodiment of the present invention.
Figure 2B:
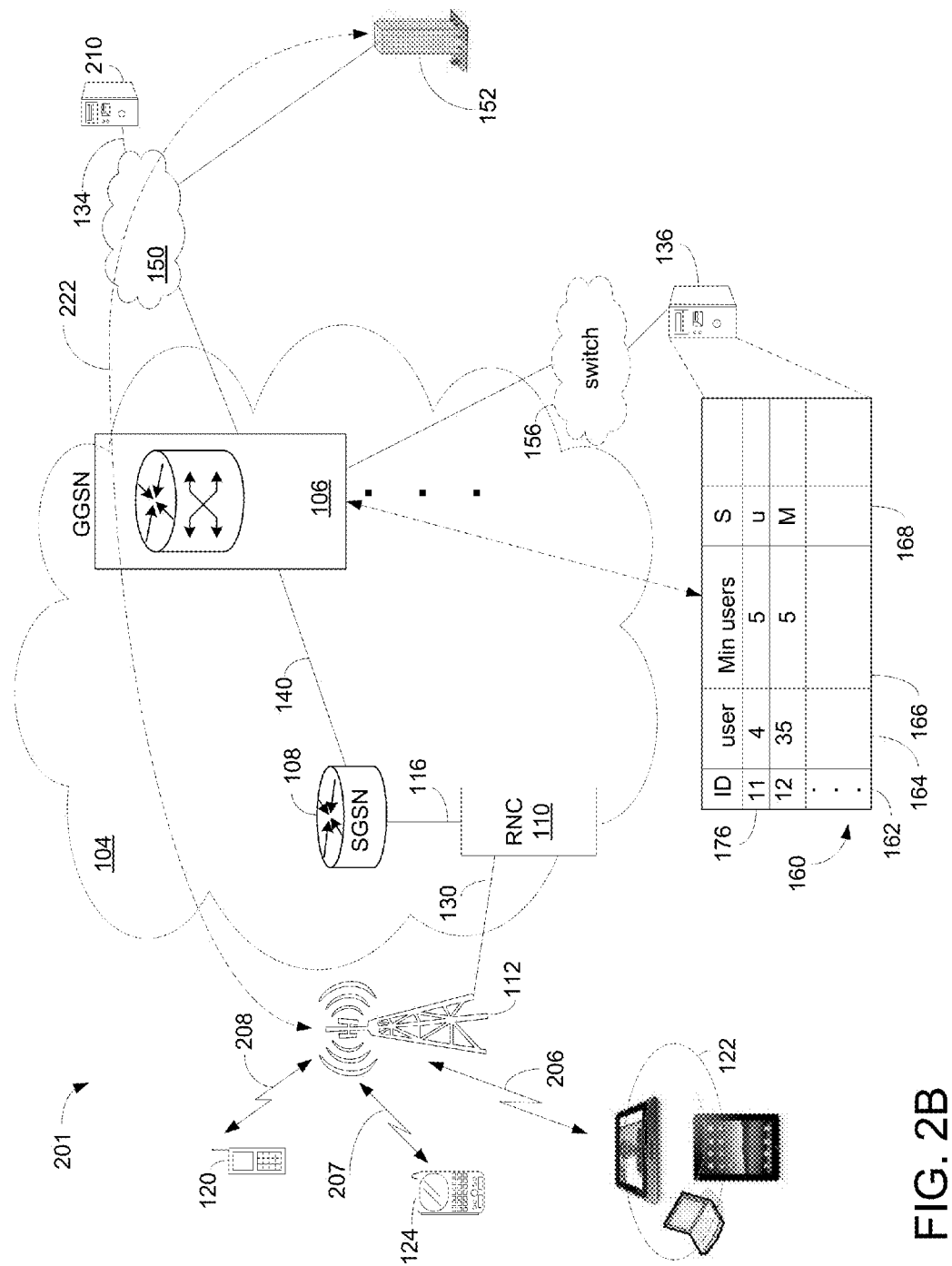

FIGS. 2A-B are block diagrams 200-201 illustrating simplified network configurations capable of performing video optimization for broadcast media in accordance with one embodiment of the present invention. Diagrams 200 and 201 are simplified versions of diagram 100 as shown in FIG. 1. Diagram 200 includes radio tower 112, GGSN 106, SGSN 108, and Internet 150 wherein Internet 150 connects to various network devices such as data server 210 and content provider 152. Radio tower 112 is further connected to various UEs, such as cellular phone 120, iPad® 122, and handheld device 124 via wired or wireless communications 206-208. It should be noted that the underlying concept of the exemplary embodiment(s) of the present invention would not change if one or more blocks (or devices) were added to or removed from diagram 200.

To deliver channelized video content from content provider 152 to iPad® 122 via GGSN 106, for example, VOB delivers video stream or channelized video content based on information stored in database 160. Upon receiving a request for the channelized video content from a network client such as UE 124, VOB identifies the channelized video content with an identity value such as 11. After identification, VOB retrieves current number of users from user column 164 of database 160 and increases the current number of users by one (1) to include the requesting user. Retaining the current broadcast status of uni-casting 202 if the updated number of users is less than the predefined minimal number of users as indicated in column 166 of database 160. If the updated number of current users is equal to or greater than the predefined minimal number of users, a process of switching from uni-casting to multicasting is initiated when current delivery method of channelized video content is uni-casting. If the updated number of current users is equal to or greater than the predefined minimal number of users and the current broadcasting status is multicasting, UE 124, which requests the service, is subsequently configured to receive or listen into the broadcast via the established multicasting session.

Diagram 200 illustrates uni-casting sessions 202-203 wherein content provider 152 is able to broadcast channelized video content to iPad via uni-casting session 202 and to UE 124 via uni-casting session 203. Alternatively, base station or radio tower 112 receives all broadcasting channels from a broadcasting server 210 via Internet 150 and core network 104. Base station 112, in one embodiment, is selectively broadcasting one or more channelized video content using either uni-casting or multicasting depending on the number of users or UEs.

Diagram 201, shown in FIG. 2B, illustrates a multicasting session(s) from content provider 152 to various network clients or UEs 120-124. Base station 112, in one embodiment, receives channelized video content from provider 152 or broadcasting server 210 and broadcasts channelized video content to various UEs via multicasting session(s) 206-208. Linear programming content or channelized video content travels from content provider 152 to base station 112 through either wired, wireless, or a combination of wired and wireless communications network(s) 222.

VOB, in one embodiment, employs various radio or cellular technologies such as wideband digital communication scheme to facilitate and optimize video broadcasting. For example, Orthogonal Frequency Division Multiplexing ("OFDM") is a wideband digital communication scheme employing digital multi-carrier modulation method. VOB, for instance, uses OFDM for time and frequency based spectrum to transmit digitally modulated data. In addition, OFDM is able to provide Single Frequency Network which, for example, allows multiple users to listen or receive broadcast media or channelized video content simultaneously. Employing OFDM in VOB can provide an efficient way to deliver media broadcasting. It should be noted that broadcasting technologies, such as DVB (digital video broadcasting) and/or MDB, use OFDM to broadcast channelized video content, such as Disney channel and CNN channel, to mobile UEs. Note that WiMax (Worldwide Interoperability for Microwave Access) and LTE employ OFDM to perform downlink and/or uplink data transfer.

Figure 3:
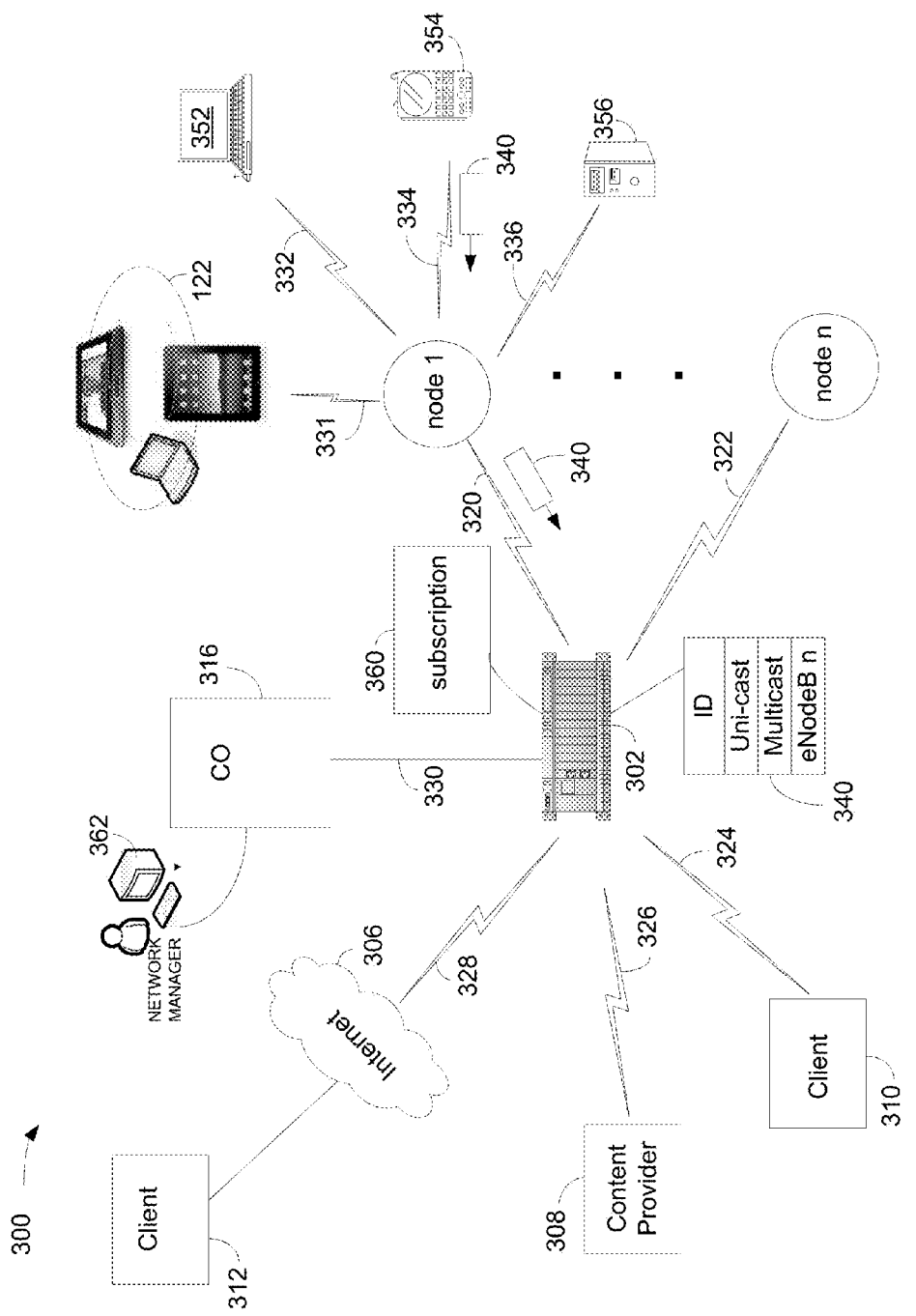
FIG. 3 is a block diagram illustrating an alternative exemplary network system capable of delivering channelized video content using video optimization in accordance with one embodiment of the present invention.

FIG. 3 is a block diagram illustrating an alternative exemplary network system capable of delivering channelized video content using VOB in accordance with one embodiment of the present invention. Diagram 300 includes a network device 302, central office ("CO") 316, content provider 308, clients 310-312, and network nodes (1 to n). Node 1, for example, is a physical network node that can be a network element ("NE") or a cluster of network devices, such as a router, modem, hub, bridge, switch, handset, computer, server, workstation, et cetera. Node 1, for example, is a network entity capable of coupling to host 352, portable device 354, and server 356 via wireless connections 331-336. It should be noted that the underlying concept of the exemplary embodiment(s) of the present invention would not change if one or more blocks (or devices) were added to or removed from diagram 300.

Device 302, which may be a router configured to perform functions of GGSN and/or VOB, is able to route network traffic between nodes and/or network clients such as clients 310-312 or devices 352-356. A network manager or administrator 362 is able to communicate with device 302 via CO 316. In one embodiment, CO 316 is coupled to device 302 via connection 330. Alternatively, CO 316 can be configured to reside within device 302. Device 302 can also be configured to provide routing services to remote clients such as client 312 via Internet 306. Connections 320-328, which can be wired, wireless, or a combination of wired and wireless connections, are employed to couple device 302 to clients 310-312, content provider 308, and nodes.

Device 302, in one embodiment, performs a function of a network router capable of routing channelized video flows or contents between content providers and UEs such as iPad 122, laptop 252, smart phone 354, and the like. At any given time, hundreds or thousands of packets or packet streams may be traveling through device 302 simultaneously. A function of network router is to monitor, inspect, and route packet streams between clients and nodes in accordance with a set of service parameters, network policy, and rules. Device 302, in one aspect, is capable of perform VOB functions.

To optimize video broadcasting delivery, VOB is able to detect various video flows containing channelized video content and to track the flows or at least a portion of the flows based on tracking information. VOB, in one embodiment, includes a table 340 which is used to record necessary tracking data to track channelized video content. Table 340, which is similar to database 160 shown in FIG. 1, is configured to be dynamically updated when VOB receives new requests and/or terminations regarding one or more particular channelized video content. In addition to record ID of channelized video content, table 340 also records uni-casting status, multicasting status, identity of base station, and so forth. Based on the data stored in table 340, VOB is able to determine whether a particular channelized video content should be broadcasted using uni-casting or multicasting.

During an operation, device 302 receives a request 340 for channelized video content from UE 354 via node 1. After verifying the subscription in accordance with database 360 and identifying requested channel (or identity) associated with request 340 such as Disney channel, VOB searches and identifies tracking data associated with the channelized video content. If no tracking data is identified, VOB establishes a uni-casting session between content provider and UE 354 and broadcasts the requested channelized video content via the uni-casting session. If tracking data indicates that multicasting of requested channelized video content already exists, VOB allows UE 354 to receive or listen into the multicasting of requested channelized video content if the multicasting is established at the same base station as UE 354. If tracking data indicates that uni-casting sessions are used to broadcast requested channelized video content, VOB establishes another uni-casting session for broadcasting the requested channelized video content to UE 354 when number of users is less than a predefined minimal number. If tracking data indicates that uni-casting sessions are currently used to broadcast requested channelized video content, VOB establishes multicasting session to broadcast the requested channelized video content when number of users is equal to or greater than a predefined minimal number and all of the users can be serviced at the same base station. Upon establishing a multicasting session, VOB switches users from uni-casting to multi-casting to receive the channelized video content.

Embodiment(s) of the present invention facilitates channelized video content to be broadcasted dynamically over a particular base station triggered or initiated by VOB in the core network. VOB, which can reside in a P-GW, allocates the IP address resource to the end user devices wherein VOB tracks every flow of channelized video content being watched and broadcasted, and instructs the radio controller to offer the content as a broadcast if there is enough number of users on a particular base station. The core network element such as P-GW, for example, can be configured to keep track of appropriate information to make such a trigger to broadcast information at the base stations. Upon triggering, the base station is able to identify the number of users and move them to a newly allocated resource for the broadcast channel. Employing VOB can reduce network traffic between the core network and the base station as well as network traffic between base station and end user devices. VOB can alleviate overall network congestion and enhance overall network performance.

Figure 4:
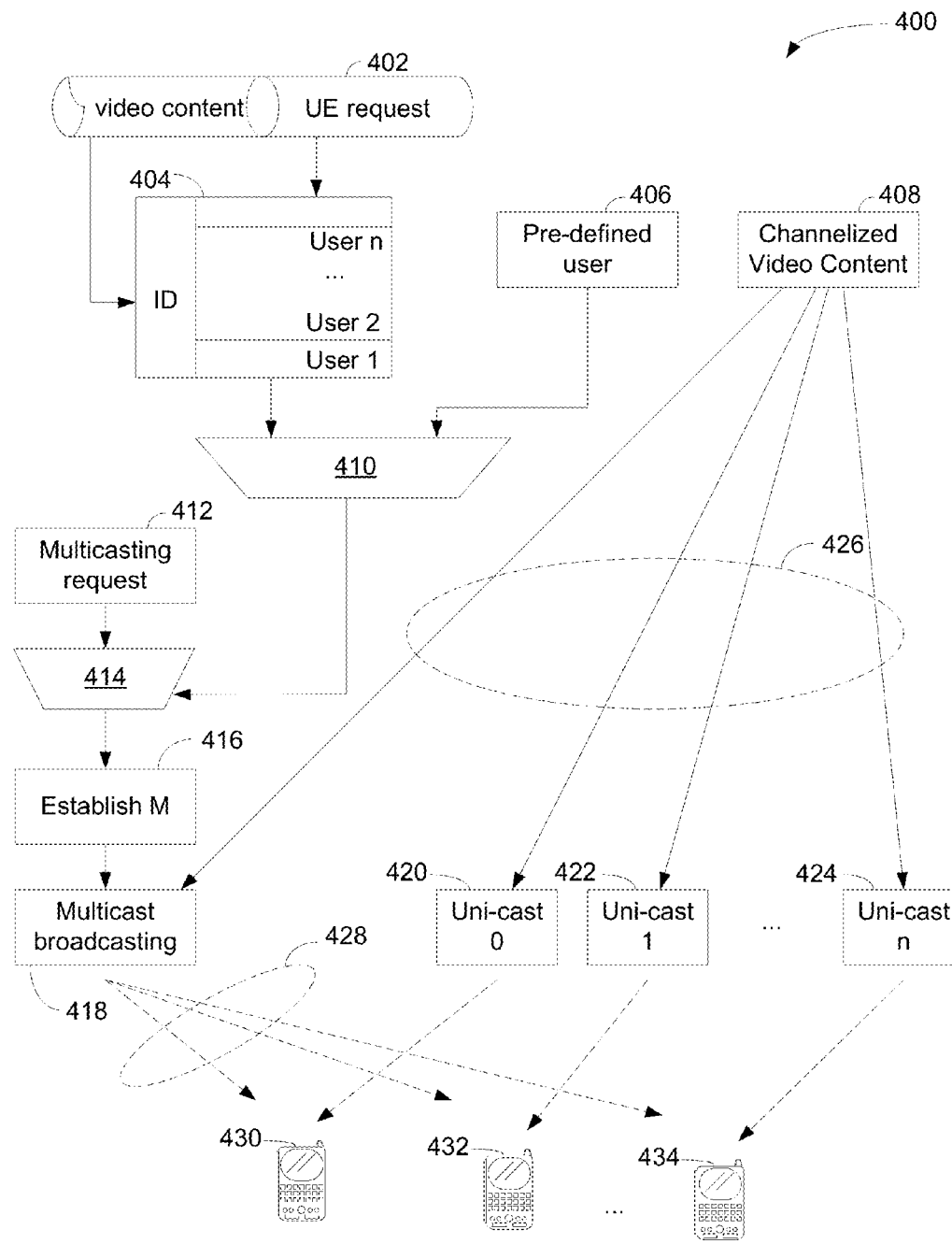
FIG. 4 is a logic flow diagram illustrating a broadcast media delivering process able to efficiently deliver channelized video content to mobile users in accordance with one embodiment of the present invention.

FIG. 4 is a logic flow diagram 400 illustrating a broadcasting process of VOB capable of switching delivery method from uni-casting video content delivery method to multicasting video content delivery method in accordance with one embodiment of the present invention. Diagram 400 illustrates an exemplary logical process of broadcasting channelized video content using either uni-casting or multicasting delivery mechanism. VOB, in one embodiment, broadcasts channelized video content using uni-casting delivery process if the number of users less than a predefined minimal number. Alternatively, VOB broadcasts channelized video content using multicasting delivery process if the number of users is equal to or greater than a predefined minimal number of users in accordance with the predefined minimal number.

Upon receiving a request 402, user associated to request 402 is added to the user section of table 404 and the video content or at least a portion of content is forwarded to the ID section of table 404 after the identity of channelized video content is determined. For example, the identity of channelized video content is associated with Disney channel. The total number of users from table 404 is fetched and it is subsequently compared with a predefined minimal number of users from predefined user element 406. If the total number of users from table 404 is less or smaller than the predefined minimal number, VOB establishes an additional uni-casting session (as a point-to-point link) between channelized video content provider 408 and UE such as UE 434 for delivery channelized video data.

If the total number of users from table 404 is equal to or greater than the predefined minimal number, the output signal from block 410 allows block 414 to issue a multicasting request from block 412. After establishing a multicasting session at block 416, block 418 begins to deliver channelized video content using multicast broadcasting. VOB subsequently switches delivery method from uni-casting delivery method 426 to multicasting delivery method 428 for delivering channelized video content. During a switching phase, uni-cast 0 to n 420-424 terminate broadcast while multicast broadcasting 418 begins to broadcast.

Figure 5:
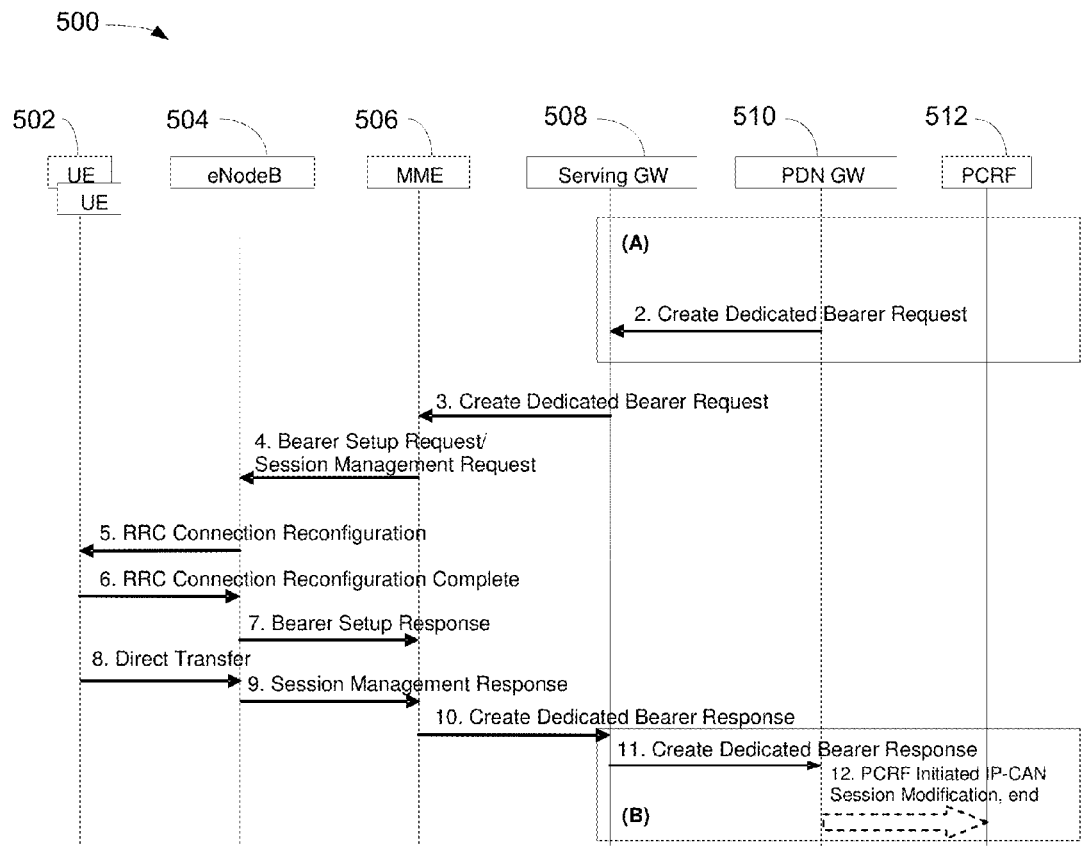
FIG. 5 illustrates a process of switching from uni-casting channelized video content delivery to multicasting channelized video content delivery in accordance with one embodiment of the present invention.

FIG. 5 is a logic control diagram 500 illustrating a process of switching delivery method from uni-casting channelized video content delivery method to multicasting channelized video content delivery method in accordance with one embodiment of the present invention. Diagram 500 shows UE 502, eNodeB 504, MME 506, S-GW 508, P-GW 510, and PCRF 512 wherein uni-cast transactions between each user and the content server have been established and video content flows between content provider and base station over a range of radio frequency spectrum.

At step 2, P-GW 510 creates a dedicated bearer request and forwards it to S-GW 508. Note that VOB, in one embodiment, resides at P-GW 510. At step 3, S-GW 508 creates a dedicated bearer request and forwards the request to MME 506. MME 506, at step 4, initiates a bearer setup request/session management request and forwards the requests to eNodeB 504. eNodeB 504, at step 5, forwards a radio resource control ("RRC") connection reconfiguration to UE 502. The PGW suggests to eNodeB modifying the radio resource allocation to include a set of new resources to all of the UEs for the broadcast media along with the currently held resource so the broadcast media can be pushed to all the UE. Note that this is the reason for PGW to include the private extension in that message to MME and eventually to eNodeB. It should be noted that the implementation aspect can vary from having a reserved set of resources to having a dynamic set of resources.

UE 502, at step 6, sends a signal to eNodeB 504 indicating that RRC connection reconfiguration is completed. At step 7, eNodeB 504 issues a bearer setup response to MME 506 indicating completion of RRC connection configuration. UE 502, at step 8, transmits a signal of direct transfer to eNodeB 504 indicating that UE is ready to receive video streams. At step 9, eNodeB 504 forwards a session management response to MME 506. MME 506, at step 10, creates a dedicated bearer response and forwards the response to S-GW 508. S-GW 508, at step 11, creates a dedicated bearer response and forwards the response to P-GW 510. At step 12, PCRF initiates IP-CAN session modification.

P-GW 510, also known as PDN gateway, monitors video streams flowing through the network and keeps track of the same video sessions that are occurring in a base station or eNodeB 504. When there are a group of users watching or receiving the same channelized content through uni-casting video session at the same base station, a new dedicated bearer request is initiated to modify the session from uni-casting to multicasting. It should be noted that predefined minimal number of user can be anywhere from 1 to 5 depending on the applications. The RRC connection reconfiguration procedure moves the users from single broadcast to multicast stream. PDN Gateway subsequently updates the PCRF for session modification to broadcast/multicast service to align with the policy and charging functions of the service.

The following tables A-B illustrate the 3rd Generation Partnership Project ("3GPP") messages which can be used to create bearer requests. The last row of table A indicates a multicast bearer for channelized video content streaming to the second UE, by the PDN GW to S-GW and MME.

TABLE A

Information Elements in a Create Bearer Request

| Information elements | P | Condition/Comment | IE Type | Ins. |
|---|---|---|---|---|
| Procedure Transaction Id (PTI) | C | This IE shall be sent when the procedure was initiated by a UE Requested Bearer Resource Modification Procedure or Secondary PDP Context Activation Procedure. The PTI shall be the same as the one used in the corresponding Bearer Resource Command. | PTI | 0 |
| Linked Bearer Identity (LBI) | M | This IE shall be included to indicate the default bearer associated with the PDN connection. | EBI | 0 |
| Protocol Configuration Options (PCO) | O | | PCO | 0 |
| Bearer Contexts | M | Several IEs with this type and instance values shall be included as necessary to represent a list of Bearers. | Bearer Context | 0 |
| PGW-FQ-CSID | C | This IE shall be included by the PGW on the S5/S8 interfaces and shall be forwarded by the SGW on the S11 interface according to the requirements in 3GPP TS 23.007 [17]. | FQ-CSID | 0 |
| SGW-FQ-CSID | C | This IE shall be included by the SGW on the S11 interface according to the requirements in 3GPP TS 23.007 [17]. | FQ-CSID | 1 |
| Change Reporting Action | C | This IE shall be included with the appropriate Action field If the location Change Reporting mechanism is to be started or stopped for this subscriber in the SGSN/MME. | Change Reporting Action | 0 |
| Private Extension | O | PDN GW can indicate to SGW/MME/SGSN/eNodeB about this bearer being a multicast bearer | Private Extension | VS |

NOTE: In the case that the procedure is initiated by a UE Requested Bearer Resource Modification Procedure or Secondary PDP Context Activation Procedure, one instance of the Bearer Contexts IE in the Create Bearer Request is generated.

TABLE B

Bearer Context within Create Bearer Request

| Octets 1 | Bearer Context IE Type = 93 (decimal) |
| Octets 2 and 3 | Length = n |
| Octets 4 | Spare and Instance fields |

| Information elements | P | Condition/Comment | IE Type | Ins. |
|---|---|---|---|---|
| EPS Bearer ID | M | This IE shall be set to 0. | EBI | 0 |
| TFT | M | This IE can contain both uplink and downlink packet filters to be sent to the UE. Downlink packet filters are also used by SGW for PMIP based S5/8 interfaces. | Bearer TFT | 0 |
| S1-U SGW F-TEID | C | This IE shall be sent on the S11 interface if the S1-U interface is used. | F-TEID | 0 |

TABLE B-continued

Bearer Context within Create Bearer Request

| Octets 1 | | Bearer Context IE Type = 93 (decimal) | | |
|---|---|---|---|---|
| Octets 2 and 3 | | Length = n | | |
| Octets 4 | | Spare and Instance fields | | |
| Information elements | P | Condition/Comment | IE Type | Ins. |
| S5/8-U PGW F-TEID | C | This IE shall be sent on the S4, S5/S8 and S11 interfaces for GTP-based S5/S8 interface. The MME/SGSN shall ignore the IE on S11/S4 for PMIP-based S5/S8 interface. | F-TEID | 1 |
| S12 SGW F-TEID | C | This IE shall be sent on the S4 interface if the S12 interface is used. | F-TEID | 2 |
| S4-U SGW F-TEID | C | This IE shall be sent on the S4 interface if the S4-U interface is used. | F-TEID | 3 |
| Bearer Level QoS | M | | Bearer QoS | 0 |
| Charging Id | C | This IE shall be sent on the S5/S8 interface. | Charging Id | 0 |
| | O | If the S5/S8 interface is GTP, this IE may be sent on the S4 interface, in order to support CAMEL charging at the SGSN. | | |
| Bearer Flags | O | Applicable flags are: PPC (Prohibit Payload Compression) | Bearer Flags | 0 |

MME as part of E-RAB setup procedure is able to reuse the existing connection to the eNodeB for content transferring. MME is also capable of instruct eNodeB or base station to allocate the same radio resource that is used for streaming the channelized video content.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
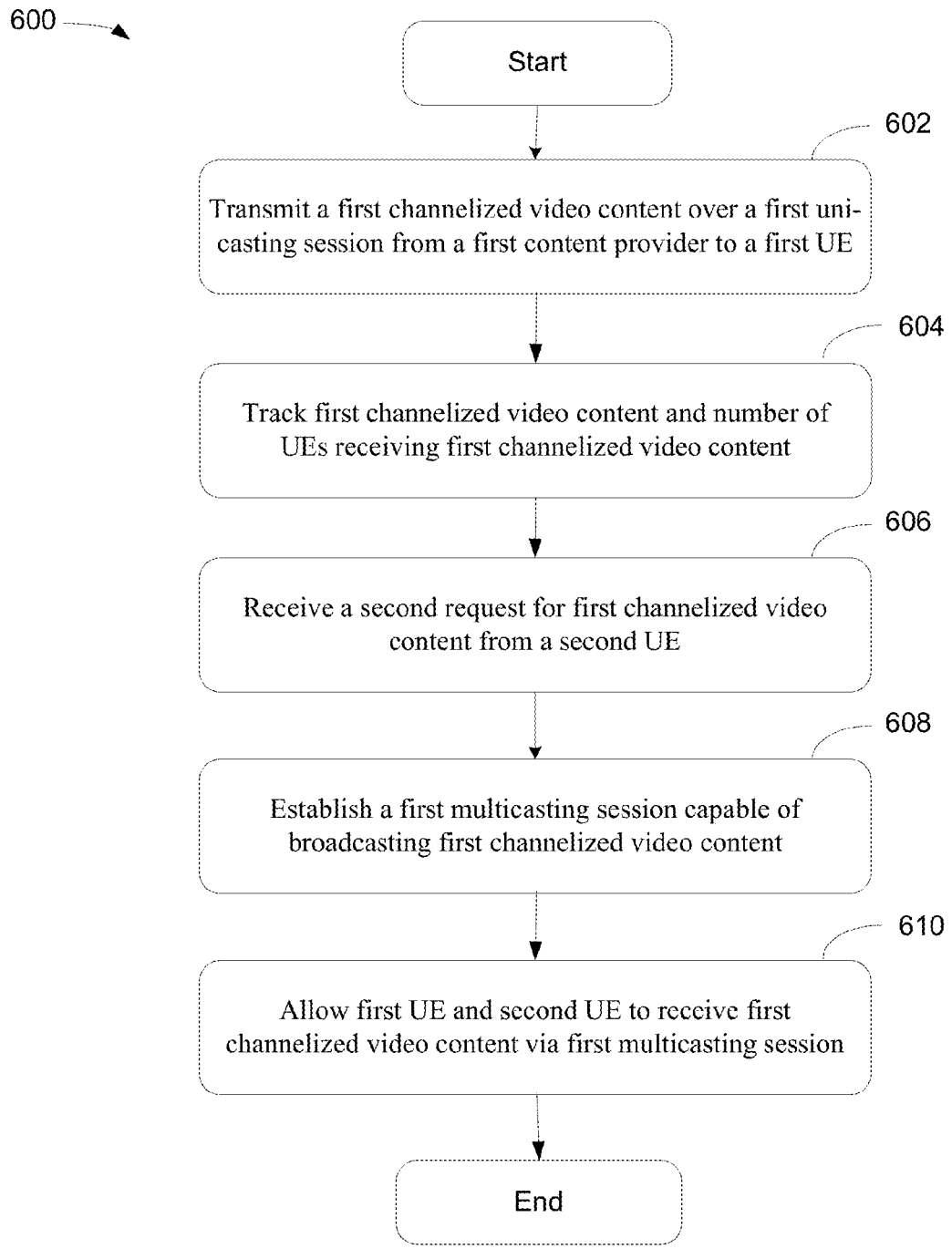
FIGS. 6-7 are flowcharts illustrating processes of broadcasting media content using a multicasting session in accordance with one embodiment of the present invention.

FIG. 6 is a flowchart 600 illustrating a process of broadcasting media content using a multicasting session in accordance with one embodiment of the present invention. At block 602, the process of media broadcasting transmits first channelized video content over a first uni-casting session from a first content provider to a first UE via a base station. In one embodiment, upon receiving a first request for the first channelized video content from the first UE, a first uni-casting session between the first UE and the base station is established. Video stream, for example, is delivered from a media broadcasting content provider to a portable smart phone via a point-to-point network connection or uni-casting session(s).

At block 604, the first channelized video content and number of UEs or users currently receiving the first channelized video content are identified and tracked. For example, the first channelized video content is identified and the identity of the first channelized video is stored in a memory. A total number of UEs currently receiving the first channelized video content is dynamically accounted and the accounted total number of UEs is stored in a memory.

At block 606, a second request for the first channelized video content is received from a second UE via the base station. In one embodiment, the process verifies the requested video content with the identity of video content requested by the first UE.

At block 608, a first multicasting session capable of broadcasting the first channelized video content is established. In one embodiment, after comparing the total number of users or UEs with a predefined minimal number, the first UE is switched from the first uni-casting session to the first multicasting session if the total number of UEs is the same as the predefined minimal number of users. In one example, the process is capable of instructing the base station to broadcast the first channelized video content through the first multicasting session.

At block 610, the first UE and the second UE are allowed to receive the first channelized video content at the same base station via the first multicasting session. In one embodiment, upon transmitting second channelized video content over a second uni-casting session from a second content provider to a third UE via the base station, the second channelized video content and number of UEs receiving the second channelized video content are tracked. After receiving a fourth request for the second channelized video content from a fourth UE via the base station, a second multicasting session capable of broadcasting the second channelized video content is established. The third UE and the fourth UE are subsequently allowed to receive the second channelized video content via the second multicasting session. For example, the multicasting session between the base station and the first and second UEs can be established for content delivery.

Figure 7:
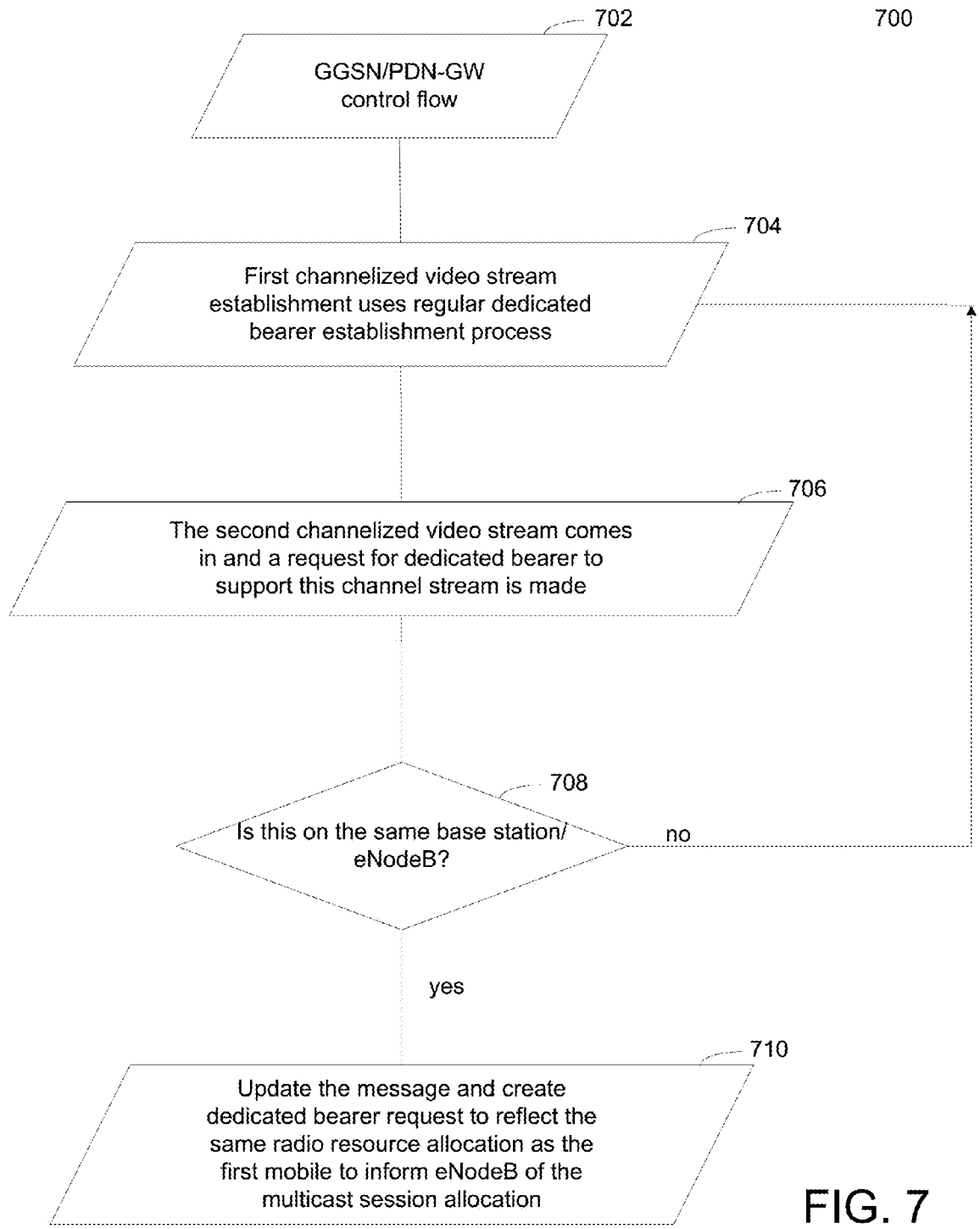

FIG. 7 is flowchart 700 illustrating a process of broadcasting media content using a multicasting session in accordance with one embodiment of the present invention. At block 702, GGSN or PDN-GW or VOB monitors and controls various packet flows traveling through the network. At block 704, the establishment of first channelized video stream uses regular dedicated bearer establishment process as shown in FIG. 5. At block 706, a second channelized video stream arrives and a request for dedicated bearer to support his channel stream is made. At block 708, the process examines whether the request and/or establishment are located at the same base station (or eNodeB). If the request and establishment are at the same base station, the process moves to block 710. Otherwise the process loops back to block 704. At block 710, the process updates the message and creates dedicated bearer request to reflect the same radio resource allocation as the first mobile when the process informs eNodeB of the multicasting session allocation.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method of media broadcasting over a communications network, comprising:
monitoring network traffic flowing through a router and separating by the router a first channelized video content from the network traffic originated by a first content provider;
establishing a first uni-casting session from the router to a first user equipment ("UE") via a base station and transmitting the first channelized video content to the first UE;
tracking by the router the first channelized video content and number of UEs receiving the first channelized video content and recording a uni-casting delivery for the first channelized video in a broadcast database;
receiving a second request for the first channelized video content from a second UE via the base station;
resetting a first session type associated with the first channelized video content from a uni-casting session to a multicasting session in response to the number of UEs stored in the broadcast database;
establishing a first multicasting session capable of broadcasting the first channelized video content in accordance with the first session type in the broadcast database; and
switching the first UE to receive the first channelized video content from the first uni-casting session to the first multicasting session.

2. The method of claim 1, further comprising:
receiving a first request for the first channelized video content from the first UE; and
establishing the first uni-casting session between the first UE and the base station.

3. The method of claim 1, further comprising:
transmitting second channelized video content over a second uni-casting session from a second content provider to a third UE via the base station;
tracking the second channelized video content and number of UEs receiving the second channelized video content;
receiving a fourth request for the second channelized video content from a fourth UE via the base station;
establishing a second multicasting session capable of broadcasting the second channelized video content; and
allowing the third UE and the fourth UE to receive the second channelized video content via the second multicasting session.

4. The method of claim 1, wherein transmitting first channelized video content over a first uni-casting session includes delivering a video stream from a media broadcasting content provider to a portable smart phone via a point-to-point network connection.

5. The method of claim 1, wherein tracking the first channelized video content includes identifying the first channelized video content and storing an identity associated with the first channelized video in a memory.

6. The method of claim 1, wherein tracking the first channelized video content and number of UEs receiving the first channelized video content includes accounting a total number of UEs currently receiving the first channelized video content and storing the total number of UEs in a memory.

7. The method of claim 1, wherein receiving a second request for the first channelized video content from a second UE includes verifying video content requested by the second UE is substantially same content requested by the first UE in accordance with the identity.

8. The method of claim 7, wherein establishing a first multicasting session includes,
comparing the total number of UEs with a predefined number of users; and
switching the first UE from the first uni-casting session to the first multicasting session if the total number of UEs is same as the predefined number of users.

9. The method of claim 8, wherein switching the first UE from the first uni-casting session to the first multicasting session includes,
forwarding a switching instruction from a gateway to the base station;
modifying resource allocation to multiple UEs with additional resources for media broadcast;
enabling UEs to receive the media broadcast; and
instructing the base station to broadcast the first channelized video content through the first multicasting session.

10. The method of claim 1, wherein allowing the first UE and the second UE to receive the first channelized video content via the first multicasting session includes setting up the multicasting session between the base station and the first and second UEs.

11. A method for media broadcasting, comprising:
monitoring network traffic and separating by a router a first channelized video content from the network traffic originated by a first content provider;
tracking the first channelized video content to be transmitted to a user;
counting number of users requesting and receiving the first channelized video content and recording a uni-casting transmission for delivery of the first channelized video in a broadcast database;
identifying whether to perform a switchover from a plurality of uni-casting transmissions to a multicasting transmission for broadcasting the first channelized video content and resetting a first session type associated with the first channelized video content from a uni-casting session to a multicasting session in response to the number of UEs stored in the broadcast database;
establishing a multicasting session between the router and a base station; and
switching from the plurality of uni-casting sessions to the multicasting session for broadcasting the first channelized video content from the base station to one or more users.

12. The method of claim 11, further comprising updating session modification of multicast service in accordance with policy, charging, and rules functions.

13. The method of claim 12, further comprising
receiving a request for the first channelized video from a second user; and
allowing the second user to receive the first channelized video from the multicasting session.

14. The method of claim 11, further comprising:
receiving a request for a second channelized video content;
tracking the second channelized video content and counting number of users receiving the second channelized video content;

determining whether to perform a switchover from a plurality of uni-casting transmissions to a multicasting transmission for broadcasting the second channelized video content to users; and establishing a uni-casting session at the base station for transmitting the second channelized video content when predefined minimum number of users is not satisfied.

15. A method of broadcasting media, comprising:

receiving a request for channelized video content from a user equipment ("UE");

retrieving number of UEs and session type associated to the channelized video content from a database;

determining current broadcasting status relating to the channelized video content in response to the number of UEs and session type;

monitoring network traffic flowing through a switch and identifying by the switch the channelized video content from the network traffic;

establishing a uni-casting session between the switch and the UE to deliver the channelized video content to the UE when requirement of delivery channelized video content via multicasting session based on the session type and the number of UEs is not satisfied; and allowing the UE to receive the channelized video content through the multicasting session when the multicasting session for delivery the channelized video content is established.

16. The method of claim 15, wherein receiving a request for channelized video content further includes throttling network bandwidth allocated to user network access, wherein throttling network bandwidth includes, determining identity of the channelized video content; and identifying number users receiving the channelized video content.

17. The method of claim 16, wherein determining current broadcasting status relating to the channelized video content includes determining whether the request for channelized video content is a new video content for a base station to broadcast.

18. The method of claim 17, wherein determining whether the request for channelized video content is a new video content further includes whether a multicasting session for transmitting the channelized video content exists.

19. The method of claim 18, wherein establishing a uni-casting session to deliver the channelized video to the UE when requirement of delivery channelized video content via multicasting session is not satisfied includes establishing a multicasting session to broadcast the channelized video content if number of users receiving the channelized video is equal to or greater than a predefined number of minimal users.

20. The method of claim 19, wherein establishing a uni-casting session to deliver the channelized video to the UE when requirement of delivery channelized video content via multicasting session is not satisfied includes establishing the uni-casting session if number of users receiving the channelized video is less than the predefined number of minimal users.

* * * * *